Patented May 16, 1944

2,349,036

UNITED STATES PATENT OFFICE 2,349,036

ELASTICIZED RUBBER HYDROCHLORIDE FILM

George W. Ferner, Akron, Ohio, assignor to Wingfoot Corporation, Akron, Ohio, a corporation of Delaware No Drawing. Application January 9, 1942, Serial No. 426,255

3 Claims. (Cl. 260—735)

This invention relates to the plasticization of rubber hydrochloride film or other rubber hydrohalide film, or, as it has more recently and more accurately been termed, the elasticization of such film. More particularly it relates to the use of a mixture of esters of phthalic acid and sebaic acid or other dicarboxylic acids as elasticizers (plasticizers) for rubber hydrochloride film.

Materials added to plastics to change their properties have in the past been referred to generally as plasticizers. Quite recently the term "elasticizer" has been used to refer to those materials which soften and increase the elasticity of a plastic film, and thereby give increased resistance to shock or impact when tested by any usual drop-height test, and otherwise improve its properties as by giving it increased tear strength, etc. The term "elasticizer" is so used in this specification and in the appended claims.

A great many chemicals have been tested in rubber hydrochloride film to determine whether they act as elasticizers. Films containing ten parts by weight of the following materials per hundred parts of the rubber hydrochloride have materially higher drop-height values (i. e., shock resistance) than identical film containing no elasticizer:

Dibutyl phthalate
Butyl stearate
n-Butyl sebacate
n-Butyl oleate
Tetrahydro furfuryl laurate
Iso amyl stearate
Butyl orthobenzoylbenzoate (sold as Ketonone B by American Cyanamide & Chemical Corporation)
Diamyl phthalate
Ethylene glycol dibenzyl ether
Dibenzyl maleate
Butoxy ethyl phthalate
p-Benzyl phenol
Ethylene glycol mono methyl ether (sold by Carbide & Carbon Chemicals Corporation as Methyl Cellosolve phthalate)
Ethyl orthobenzoylbenzoate (sold as Ketonone E by American Cyanamide & Chemical Corporation)
Benzyl succinate
Ethyl stearate
p-Cyclohexyl phenol
Cyclohexyl adipate
Beta-ethoxy ethyl phthalate
o-Benzyl phenol
n-Propyl o-benzoyl benzoate
Butyl phthalyl butyl glycollate (sold as Santicizer B-16 by Monsanto Chemical Co.)
Ethyl benzyl aniline
o-Cyclohexyl phenol
Phenyl stearate
Diphenyl o-chlorophenyl phosphate
n-Butyl adipate
o-Methoxy diphenyl
Ethyl N phenyl N benzyl carbamate
Chlor hydroquinone
Ethylene dibenzoate
Butyl citrate
Cetyl acetate
Phenyl dicarvacrol phosphate
p,p'Diphenoxy diethyl ether
Beta-ethoxy ethyl o-benzoyl benzoate
Tricresyl phosphate
Benzyl phthalate
Triphenyl thio phosphate
Beta-chlorethyl p-toluene sulfonate
Benzoyl piperidine
o-Hydroxy diphenyl
Methyl o-benzoyl benzoate (sold as Ketonone M by American Cyanamide & Chemical Corporation)
Benzil
Triphenyl phosphate
Chlorocosane
Phenyl p-toluene sulfonate
p-Tertiary amyl phenol
Benzal acetophenone
m-Diphenyl benzene
N N'dimethyl N N'diphenyl urea
3 chloro acenaphthene
2 chloro o-phenyl phenol
Iso propyl benzoate
Benzyl aniline
o-Nitro diphenyl
n-Butyl p-toluene sulfonate
Methyl alpha naphthyl amine
Benzyl benzoate
Benzhydrol
Ethyl phthalyl ethyl glycollate (sold as Santicizer E-15 by Monsanto Chemical Company)

Comparative tests using 10% of normal butyl sebacate show that 10 parts of this material gives a higher drop-height test than 10 parts of any of the other materials above listed, although each of these gives a considerably higher drop-height test than film containing no elasticizer.

The drop-height values may be increased by adding a greater quantity of elasticizer. However, when added in amounts greater than about 10 parts per hundred, the butyl sebacate blooms out on the surface of the film giving an oily appearance and feel to the film.

According to this invention there is used as an elasticizer a mixture of (1) dibutyl sebacate or other ester of a dicarboxylic acid and (2) dibutyl phthalate or other ester of phthalic acid. By using a mixture of these materials a large amount of elasticizer may be added without causing a bloom to form on the surface of the film.

Although dibutyl phthalate is a preferred ingredient of the elasticizer composition of this invention other esters of phthalic acid may be used, such as the alkyl esters, for example, diamyl phthalate, dioctyl phthalate, etc. Mixed esters, such as the alkoxy-alkyl esters may likewise be used, such, for example, as butoxy ethyl phthalate, ethoxy ethyl phthalate, etc.

Instead of using a sebacate, esters of other dicarboxylic acids having the formula $$COOH(CH_2)_nCOOH$$

(where $n$ is at least two) may be employed, such as, for example, esters of succinic acid, esters of adipic acid, etc. The esters of the dicarboxylic acids which may be used include the dialkyl esters, such as the diethyl, dibutyl, diamyl, etc. esters of sebaic acid, etc., and the corresponding alkoxy alkyl esters such as, for example, the butoxy ethyl ester, the ethoxy ethyl ester, the ethoxy butyl ester, etc. of sebacic acid, etc., and also aralkyl esters, such as the benzyl esters, etc. of sebacic acid, etc.

The plasticizers may be used in varying amounts, such as 10 parts of each. A preferred film contains 15 parts of dibutyl phthalate and 15 parts of dibutyl sebacate. It is not necessary that the same amount of each of the different plasticizers be employed. Films containing between 10 and 20 (e. g., 10 or 15 or 20) parts of dibutyl phthalate and between 10 and 20 (e. g., 10 or 15 or 20) parts of dibutyl sebacate have been found to have great strength and flexibility and are suitable for a variety of usages such as shower curtains, umbrellas, air-plane tarpaulins, raincoats, etc.

What I claim is:

1. A non-blooming rubber hydrohalide structure elasticized with a mixture of at least 10 and not over about 20 percent by weight of a phthalate from the group consisting of the alkyl and alkoxy-alkyl esters of phthalic acid and at least 10 and not over about 20 percent by weight of an ester of a dicarboxylic acid having the formula $COOH(CH_2)_nCOOH$ where $n$ is at least two, from the group consisting of the alkyl, alkoxy-alkyl and aralkyl esters thereof, the latter being used in such an amount as to produce blooming in the absence of the former ester.

2. A rubber hydrohalide film elasticized with about 10 percent by weight of dibutyl phthalate and about 10 percent by weight of dibutyl sebacate, the latter being used in such an amount as to produce blooming in the absence of the former ester.

3. A rubber hydrochloride film elasticized with about 15 percent by weight of dibutyl phthalate and about 15 percent by weight of dibutyl sebacate, the latter being used in such an amount as to produce blooming in the absence of the former ester.

GEORGE W. FERNER.

CERTIFICATE OF CORRECTION.

Patent No. 2,349,036.  May 16, 1944.

GEORGE W. FERNER.

It is hereby certified that error appears in the printed specification of the above numbered patent requiring correction as follows: Page 1, first column, line 7, and page 2, first column, line 28, for "sebaic" read --sebacic--; page 2, second column, line 23, claim 2, for "hydrohalide" read --hydrochloride--; and that the said Letters Patent should be read with this correction therein that the same may conform to the record of the case in the Patent Office.

Signed and sealed this 1st day of August, A. D. 1944.

(Seal)  Leslie Frazer
Acting Commissioner of Patents.